(12) United States Patent
George (10) Patent No.: US 7,024,317 B1
(45) Date of Patent: Apr. 4, 2006

(54) APPARATUS AND METHOD FOR FUEL MEASUREMENT AND ACCOUNTABILITY

(76) Inventor: Anthony George, 6 E. Sienna Pl., The Woodlands, TX (US) 77382

( * ) Notice: Subject to any disclaimer, the term of this patent is extended or adjusted under 35 U.S.C. 154(b) by 0 days.

(21) Appl. No.: 10/994,449

(22) Filed: Nov. 22, 2004

(51) Int. Cl.
*G01F 1/00* (2006.01)
*G01F 23/00* (2006.01)
*G06F 19/00* (2006.01)

(52) U.S. Cl. .......................... 702/45; 702/50; 702/55; 702/100; 702/187; 702/188

(58) Field of Classification Search .............. 702/45, 702/50, 55, 81, 100, 176, 187, 188, 183, 702/185; 73/861.18, 861.22, 861.29, 113, 73/194, 195, 198; 123/492, 520, 674; 701/110, 701/123
See application file for complete search history.

(56) References Cited

U.S. PATENT DOCUMENTS 5,381,767 A * 1/1995 Kikuchi ................. 123/339.15
6,302,165 B1 * 10/2001 Nanaji et al. ................. 141/59
2005/0102112 A1 * 5/2005 Reichler et al. .............. 702/45

* cited by examiner

*Primary Examiner*—Bryan Bui
(74) *Attorney, Agent, or Firm*—Bracewell & Giuliani LLP (57) ABSTRACT

A system for establishing fuel accountability and optimization for a vehicle. The apparatus can include a fuel tank containing hydrocarbon fuels operably engaged to a fuel sensor, an engine positioned inside the vehicle adapted to power the vehicle which is operable with the hydrocarbon fuels supplied from the fuel tank into the engine through a fuel supply line directed from the fuel tank to the engine, a flow meter operably engaged to the fuel supply line which measures the flow rate of the hydrocarbon fuels moving through the fuel supply line from the fuel tank into the engine, a communication network for transmitting data interfacing with the first flow meter, a computer defining a server having a memory and interfacing with the communication network to communicate with the first flow meter and adapted to interface with a user, and a computer program stored in the memory of the computer with instructions.

36 Claims, 4 Drawing Sheets

APPARATUS AND METHOD FOR FUEL MEASUREMENT AND ACCOUNTABILITY

FIELD OF THE INVENTION

The invention relates generally to fuel measurement and accountability, and more particularly to accounting for fuel on a boat or other vehicle and providing information regarding fuel economy and optimization.

BACKGROUND OF THE INVENTION

With regard to businesses that utilize vehicles, such as a boat, truck, or automobile, it is often the case that the fuel bill can exceed payroll expenses for the business operation. When there is no process of accounting for all of the fuel on a boat or other vehicle, the possibility exists for accidental waste or intentional removal of the fuel. If waste or removal of fuel occurs, often there is no system of accountability to identify or prevent such waste or removal of fuel. The accidental waste or intentional removal of fuel on a boat or other vehicle often becomes very expensive, because the wasted or removed fuel must be replaced with additional fuel that can have to be purchased at a high cost.

Additionally, boats or other vehicles often perform at velocities or fuel burn rates that produce less than desirable fuel efficiencies. The inefficient operation of the boat or other vehicle also contributes to the waste of fuel that can otherwise be conserved or used more efficiently.

Therefore, a system is desired for accounting for all fuel available, and for conserving as much fuel as possible through efficient fuel economy and fuel optimization of the boat, truck, automobile, or other vehicle.

SUMMARY OF THE INVENTION

The invention includes a system for establishing fuel accountability and optimization for a vehicle. The system includes a fuel tank containing hydrocarbon fuels. A fuel sensor is operably engaged to the fuel tank. The system also includes an engine positioned inside the vehicle that is adapted to power the vehicle. The engine is operable with the hydrocarbon fuels supplied from the fuel tank into the engine through a fuel supply line directed from the fuel tank to the engine. The system also includes a flow meter, which is operably engaged to the fuel supply line. The flow meter measures the flow rate of the hydrocarbon fuels that move through the fuel supply line from the fuel tank into the engine. The system also includes a communication network for transmitting data that interfaces with the first flow meter. The system also includes a computer defining a server with a memory. The computer interfaces with the communication network to communicate with the flow meter and can interface with a user.

A computer program is stored in the memory of the computer. The program includes instructions to measure with the fuel sensor an amount of fuel in the fuel at a first point in time. The amount of fuel is determined through communication with the fuel sensor. The program also includes instruction to determine the amount of fuel burned by the engine between the first point in time and the second point in time. The amount of fuel burned by the engine is determined by utilizing information obtained from communication with the flow meter.

BRIEF DESCRIPTION OF THE DRAWINGS

Some of the features and advantages of the present invention having been stated, others will become apparent as the description proceeds when taken in conjunction with the accompanying drawings, in which.

DETAILED DESCRIPTION OF THE INVENTION

The present invention will now be described more fully hereinafter with reference to the accompanying drawings, which illustrate embodiments of the invention. This invention can, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figure 1:
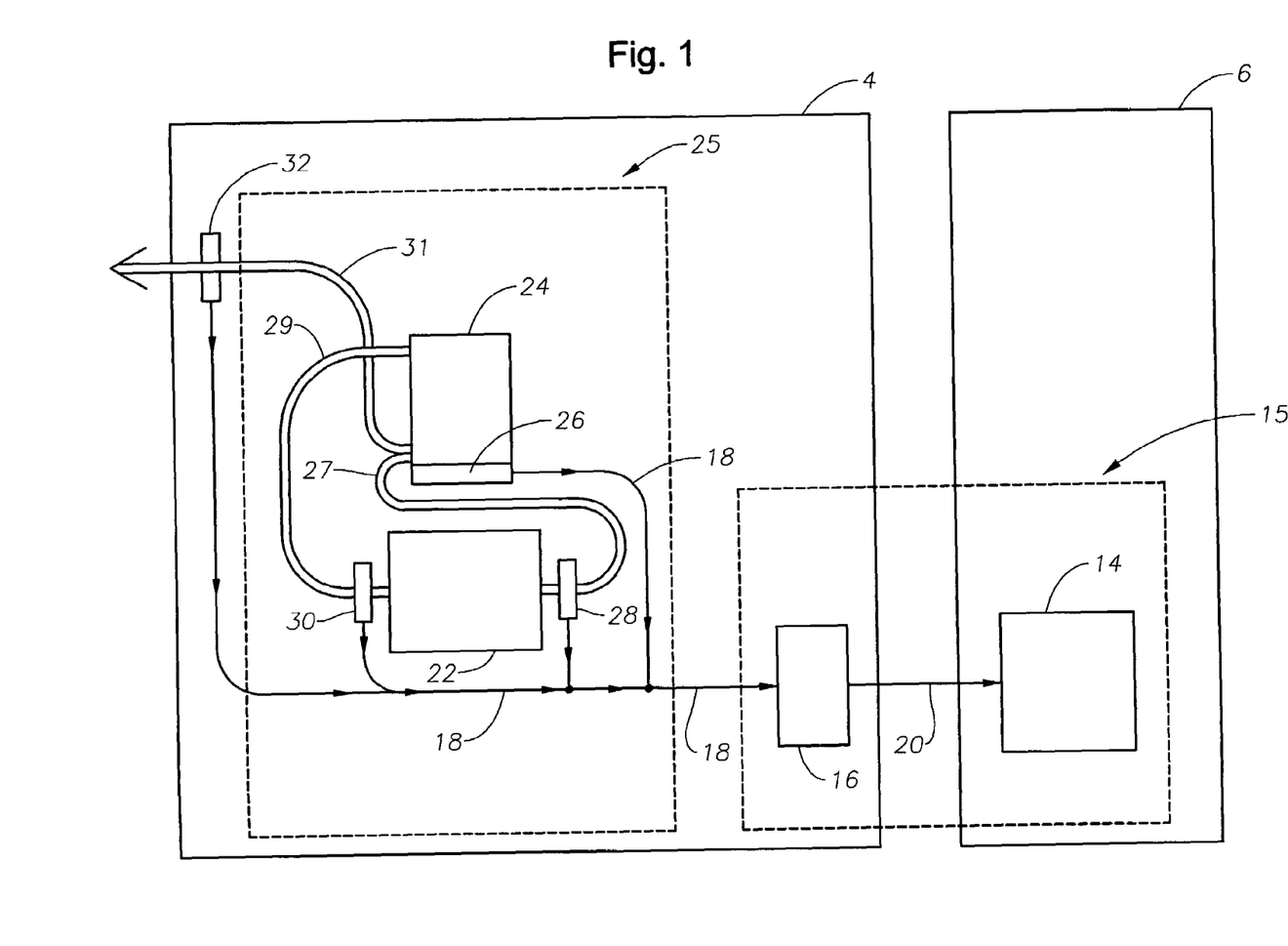
FIG. 1 illustrates the system components according to the invention.

FIG. 1 shows a diagram of a system according to an embodiment of the invention, which can be programmed to perform the functionality or method of the invention. The system of the invention includes a computer system 15 and an engine system 25. A communication network 18 interconnects the computer system 15 and the engine system 25. The engine system 25 resides in the engine room 4, and includes engines 22 to drive the propellers and generators of the vehicle, a fuel tank 24 containing fuel, and flow meters 28, 30 to measure fuel flow conditions. In the preferred embodiment, the computer 15 has components in both the wheelhouse 6 and the engine room 4 of the boat, and the computer 15 can include a client component 14 and a server component 16.

Referring to FIG. 1, the client component 14 of the computer 15 is a laptop computer component with a graphical user interface, and the server component 16 of the computer 15 is an electronics unit located in a stainless steel electronics box. Alternatively, the client component 14 and server component 16 can be in the form of other embodiments. For example, the client component 14 and the server component 16 can alternatively be a personal computer, mid-range computer, or a mainframe computer. Each of the computer components 14, 16 can include a display or monitor such as a HMI, CRT, LCD, or other monitor screen. Each of the computer components 14, 16 has a hard drive including a database to store information and a memory in which computer programs are embodied. The computer components 14, 16 can also include user interfaces such as a keyboard, mouse, data collection, touch-screen, graphical display, or other device, with which information and data are transferred to and from the computer components 14, 16 and the user. Other output devices can also be included such as printers, fascimile machines, and other such devices as understood by those skilled in the art.

The client component 14 and the server component 16 of the computer 15 preferably include a central processing unit (CPU), a read-only memory (ROM), and a random-access memory (RAM), as understood by those skilled in the art. The computer components 14, 16 can also comprise a stand-alone system or part of a network such as a local-area-network (LAN) or a wide-area-network (WAN). The client component 14 can be interconnected among each other via a global communication network such as the Internet, or a local communication Intranet network accessible only within a particular organization. In the preferred embodiment, because the client component 14 is located in the wheelhouse of the boat and the server component 16 is located in the engine room of the boat, the client component 14 is interconnected with the server component 16 via a fiber-optic cable 20 running from the engine room 4 to the wheelhouse 6.

The client component 14, the fiber-optic cable 20, and the server component 16 are collectively referred to as the computer 15. The computer 15 interfaces with a communication network 18, and the communication network 18 interfaces with the engine system 25.

Other computer system configurations can also be employed to perform the functionality of the invention, and to the extent that a particular system configuration is capable of performing the method of this invention, it is equivalent to the representative computer system of FIG. 1, and within the scope of this invention.

Once the computers are programmed to perform particular functions pursuant to instructions from program software that implements the functionality or method of this invention, such computer systems in effect become special-purpose computer systems particular to the functionality or method of this invention. The techniques necessary for this are well known to those skilled in the art of computer systems.

In addition, computer programs implementing the functionality or method of this invention will commonly be distributed to users on a distribution medium, such as floppy disk, CD-ROM, or other computer-readable medium. The term "computer-readable medium" encompasses distribution media, intermediate storage media, execution memory of a computer, and any other medium or device capable of storing a computer program implementing the functionality or method of the invention for later reading by a computer system. The computer program will often be copied from the computer-readable medium to a hard disk or a similar intermediate storage medium. When the programs are to be run, they will be loaded either from their distribution medium or their intermediate storage medium into the execution memory of the computer, configuring the computer to act in accordance with the functionality or method of this invention. All such operations are well known to those skilled in the art of computer systems.

Various software modules can be used within the computer 15 in the embodiments of the invention. The client component 14 has client software stored thereon that preferably includes software modules such as a client graphical user interface (GUI), a data generator, a data requester, a secure client connector, and a database of information and memory, each of which is understood by those skilled in the art. The data requester requests data from a user, and the data generator compiles the information into the database, which stores the information. The client component GUI provides a visually pleasing graphical user interface on a monitor to facilitate the input and output of data by a user who is using the client software within the client component 14. The secure client connector establishes a private communication session between the client component 14 and the server component 16.

The server component 16 can include software modules such as a secure server connector, a client confirmer, a security component, a data mover, and a transmission confirmer. The secure server connector allows the client component 14 to communicate with the server component 16 while keeping the nature of the communications private. The client confirmer and the security component confirm the identity of the client component 14, and effectively detect the specific user accessing the server database at a particular point in time. The data mover receives data from the client component 14, and transmits data between the client component 14 and the server component 16. The transmission confirmer can verify that particular information in the database has been transmitted to the client component 14.

The databases within the client component 14 and server component 16 can contain independent blocks of information. For example, one sub-database can include data relating to the fuel measurement and accountability process, and another sub-database can include data relating to the fuel economy and optimization process. In addition, the computer components 14, 16 can each have an independent memory to contain unique computer programs. For example, one sub-memory can contain computer programs relating to the fuel measurement and accountability process, and another sub-memory can include computer programs relating to the fuel economy and optimization process.

Each of the software programs is preferably compatible with a Microsoft operating system, but each can also coordinate with other operating systems. The computer 15 typically utilizes two pieces of software, including a generic brand such as Iconix, and a communication server such as Modbus.

The fuel measurement and accountability system can be used on boats such as commercial work boats or tug boats, but can alternatively be used in connection with cars, trucks, planes or other suitable transport vehicles. The preferred embodiment utilizes and measures diesel fuel, but alternative embodiments can use and measure other types of fuel or other fluid.

The computer 15 computes the fuel accountability results based upon several factors, including the rate at which fuel is burned in the engine 22, the relative fluid level of fuel in the fuel tank 24, and the amount of fuel transferred off the boat or other vehicle. The measurements regarding fuel burn rate, fuel tank level, and fuel transferred off the boat are used to maintain account of the fuel used or fuel available to assist the captain and crew of a boat.

In the preferred embodiment, the computer 15 includes a client component 14 and a server component 16, both of which include a database to store information and a memory containing software programs with instructions for the system to perform fuel measurement and accountability calculations as well as to perform fuel economy and optimization calculations receives data and performs algorithmic calculations.

The server component 16 of the computer 15 includes an electronics component that can be manufactured, for example, by Rugid. An analog or digital tachometer is also used congruently with the electronics unit 30 to produce a pulse train of electrical signals proportional to the rotational speed of the rotating shaft in the engine 20.

The engine system 25 includes an engine 22 for driving the propellers and generators of the boat (or other vehicle). Alternatively, the engine 22 can be understood as being multiple cylinders, multiple engine parts, multiple engines, and also other means besides conventional engines that operate to power a vehicle. A fuel tank 24 contains fuel for consumption and burning by the engine 22. A fuel input supply line 27 interfaces with the input-side of the engine 22 and the fuel tank, and supplies fuel from the fuel tank to the engine 22 to drive the boat (or other vehicle). Generally the engine 22 does not consume or burn all the fuel that is supplied to it, thus typically there is some remaining fuel that must be removed from the engine 22. As such, a fuel output supply line 29 interfaces with the output-side of the engine 22 and the fuel tank 24, and directs the unconsumed or unburned fuel from the engine 22 and directs the fuel back to the fuel tank 24 for recycling. Further, sometimes there is the need or desire to transfer fuel from the fuel tank 24 to a remote location from the vehicle. For this reason, a fuel transfer supply line 31 interfaces with the fuel tank 24, and directs any desired or needed fuel to the remote location from the vehicle.

Flow meters 28, 30 are installed on both the input side and the output side of the engine to measure flow rate in the engine 22 and out from the engine 22. An input flow meter 28 is operably engaged to the fuel input supply line 27 to measure the flow rate of the fuel into the engine 22. Similarly, an output flow meter 30 is operably engaged to the fuel output supply line 29 to measure the flow rate of the fuel from the engine 22. Furthermore, a fuel transfer flow meter 32 is operably engaged to the fuel transfer supply line 31 to measure the flow rate to determine the amount of fuel being transferred from the fuel tank 24 to a remote location from the vehicle.

The data from the flow meters 28, 30, 32 is transmitted through the communication network 18 into the database of the computer 15. The memory of the computer 15 includes instructions to evaluate the differential of the values from the input flow meter 28 and the output flow meter 30, thus instructing the computer 15 to calculate or determine the fuel burn rate inside the engine 22. The flow meters include a battery-operated monitor and can be manufactured, for example, by Tatio.

A fuel sensor 26 operably engaged to the fuel tank 24 measures the amount of fuel existing in the fuel tank 24 at both a first point in time and a second point in time. Alternatively, several sensors can be utilized to measure the amount of fuel in the fuel tank 24, wherein a first fuel sensor measures the amount of fuel in the fuel tank 24 at the first point in time, and wherein a second fuel sensor measures the amount of fuel in the fuel tank 24 at a second point in time.

The fuel sensor 26 can comprise many different forms of sensors utilized in a variety of ways. For example, the fuel sensor 26 can include a strain gage sensor, which is positioned flat along the bottom portion of the fuel tank 24. The strain gage sensor measures the effective pressure operating upon the sensor at the bottom of the fuel tank 24. The determination of the effective pressure at the bottom of the fuel tank 24, along with the dimensions of the fuel tank 26 and other variables, are then used to compute the resultant amount of fuel in the fuel tank 24 at the first point in time and the second point in time.

The flow rates from the flow meters 28, 30 and the determination of the average burn rate are established over a specific and particularized interval of time in order to determine the amount of fuel burned during that interval or period of time. The fuel tank level is measured in order to determine the decrease in the amount of fuel in the fuel tank 24 over the same interval or period of time, whether directed from the fuel tank 24 through the fuel supply lines 27, 29 into the engine 22, or whether physically removed from the fuel tank 24 off the boat. The amount of fuel transferred off the boat is also measured over the same interval of time. The operation of manipulation by the software programs of the data from the database is typically computed every few seconds, so that the aforementioned determinations are calculated and displayed to the captain and/or crew in real-time.

The embodiment described utilizes one singlular component of each of the engine 22, input flow meter 28, output flow meter 30, transfer flow meter 32, fuel tank 24, and fuel sensor 26. However, it is well understood by those skilled in the art that multiple engines, multiple flow meters, multiple fuel tanks, and multiple sensors can be utilized when necessary or desirable.

Figure 2:
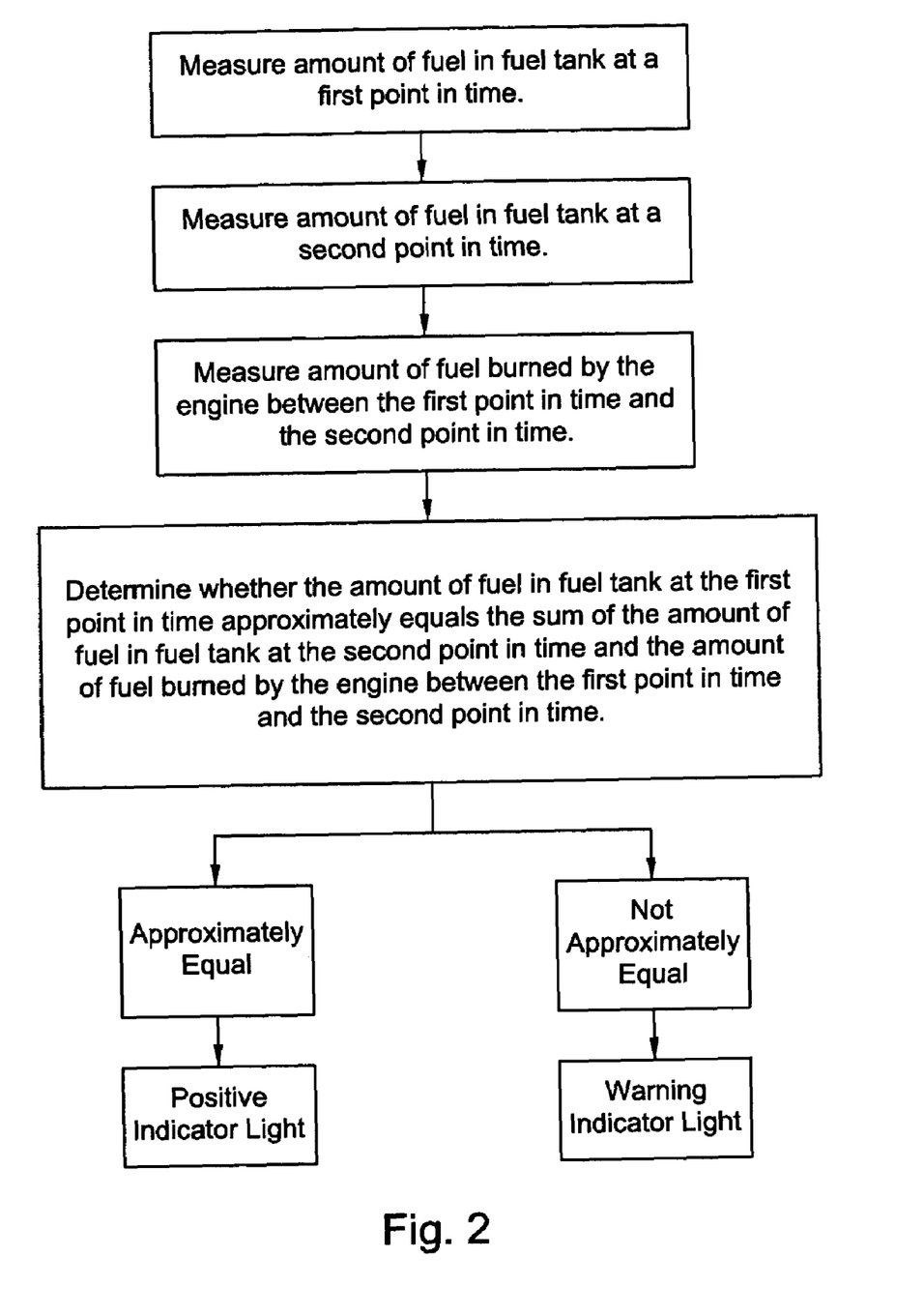
FIG. 2 illustrates a flow chart of the fuel measurement system according to the invention.
Figure 3:
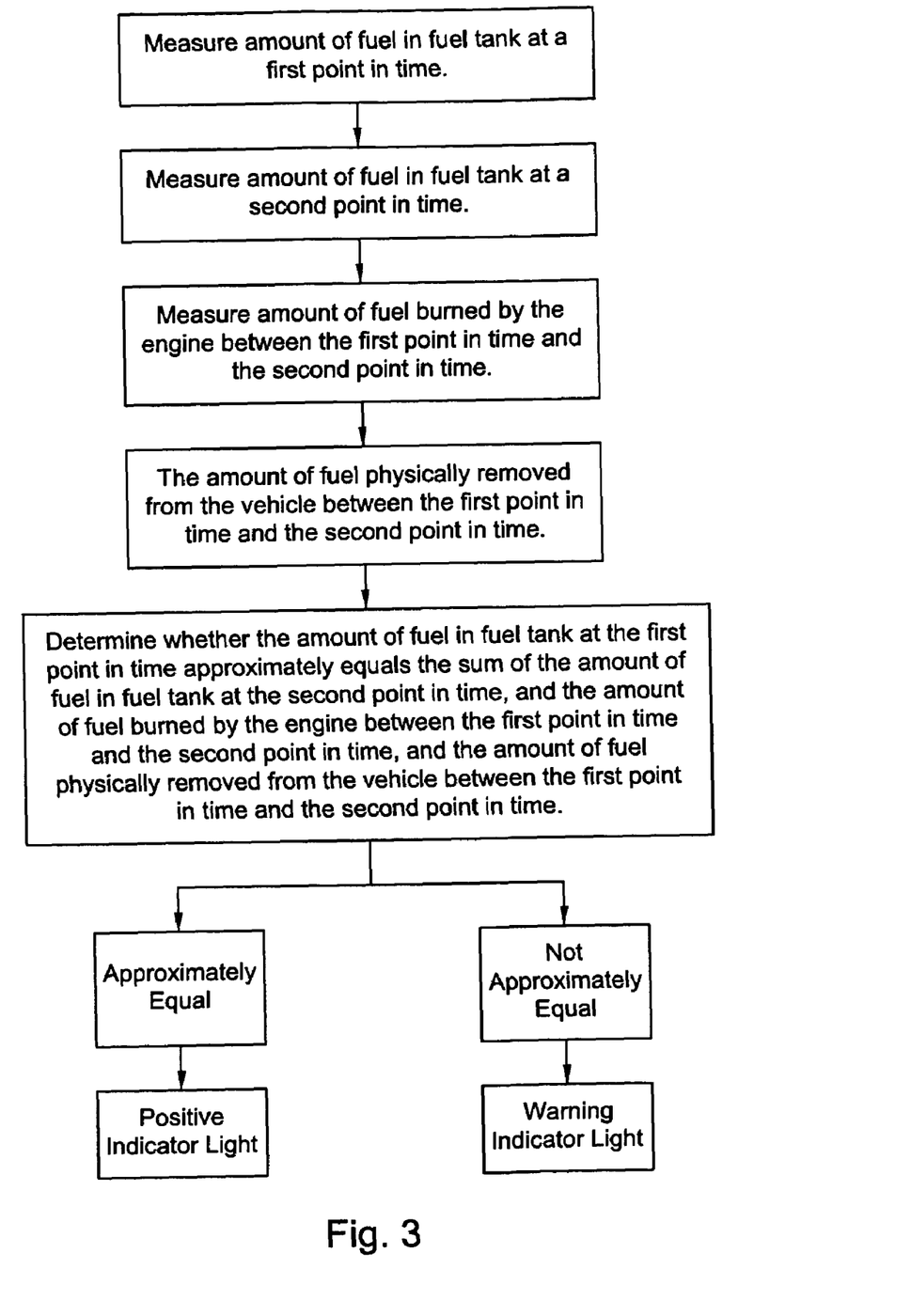
FIG. 3 illustrates another flow chart of the fuel measurement system according to the invention.

After the engine system 25 makes all the proper measurements, the computer system 15 completes all the instructions from the software to make the proper fuel accountability determinations, as shown in the flow charts in FIGS. 2 and 3. In making the proper determinations, the fuel amount can be understood as the sum of the amount of fuel burned in the engine 22 and the amount of fuel transferred off the boat. Similarly, the fuel amount can be understood as being the net decrease in the amount of fuel in the fuel tank 24. Proper fuel accountability is achieved if the sum of the amount of fuel burned in the engine 22 and the amount of fuel transferred off the boat is substantially equal to the decrease in the amount of fuel in the fuel tank 24.

If the sum of the amount of fuel burned in the engine 22 and the amount of fuel transferred off the boat is not substantially equal to the amount of fuel decrease in the fuel tank, then a visual or audio alert signal is provided to the captain and/or crew through the graphical user interface of the client component 14 of the computer 15, in order to warn them of the inconsistency in fuel measurement accountability. After receiving an alert signal, the captain and/or crew can initiate an investigation as to the cause of such an inconsistency, including inquiries into engine performance and inquiries into whether crew members or others accidentally or illicitly siphoned fuel off the boat (or other vehicle).

Measurements such as the fuel burn rate are utilized for other calculations as well, including determinations of conditions of fuel economy and optimization. For example, a Global Positioning System (GPS) can be used to assist in computing various parameters of the invention, such as conditions of the distance the boat (or other vehicle) has traveled for a particular interval of time. The distance traveled divided by the amount of fuel burned in the engine 22 equals the average fuel economy during the interval of time, for example, in miles per gallon.

The boat (or other vehicle) can operate at differing fuel economies when varying the burn rate of the engine 22 or the velocity of the boat (or other vehicle). To make the most efficient use of the fuel in the fuel tank 24, the computer program in the computer 15 can include a calculation for determining the burn rate or velocity at any particular point in time that provides the corresponding fuel economy. The system alerts the captain through the graphical user interface of the fuel economies of various burn rates and velocities at various points in time, so that the captain can operate the boat (or other vehicle) at the optimum burn rate or velocity that best conserves fuel.

Figure 4:
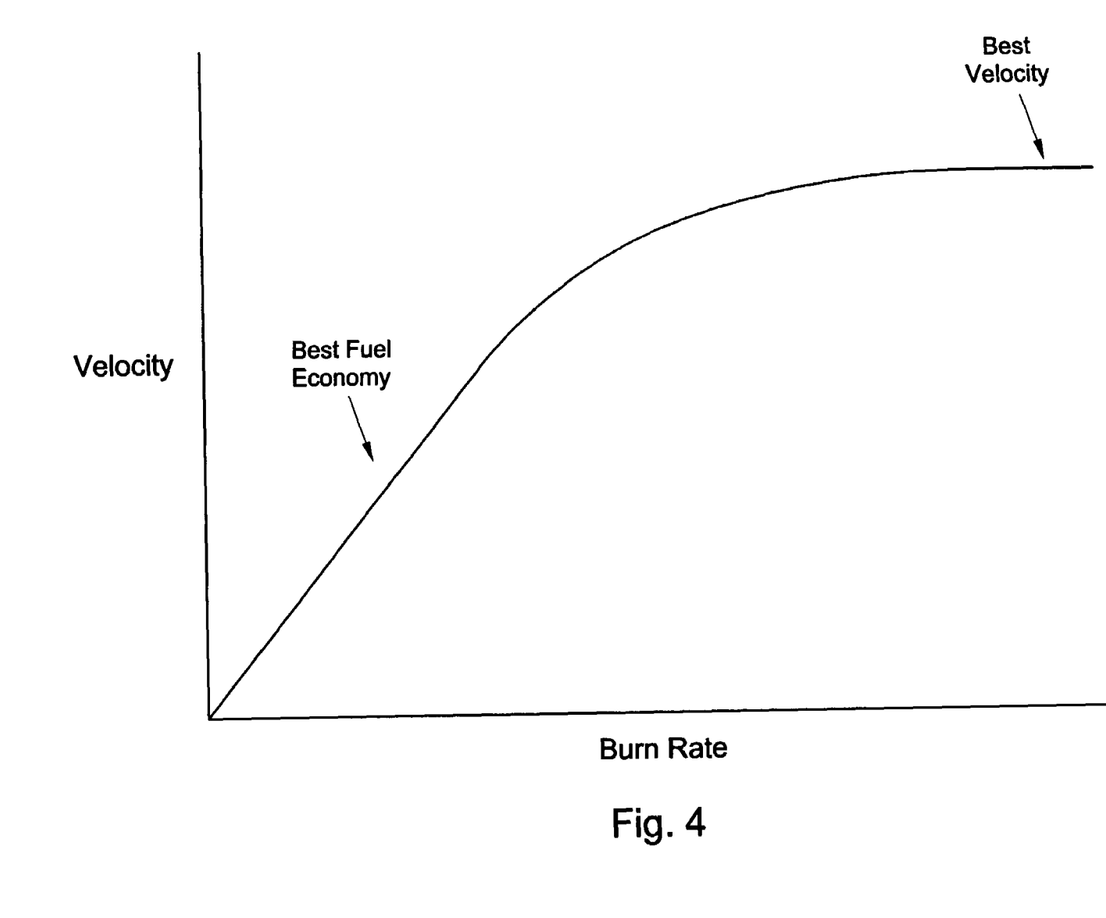
FIG. 4 illustrates an exemplary graph of burn rate versus velocity according to the invention.

Other determinations of vehicle conditions, such as optimum fuel economy and optimum velocity, will likely depend upon many unpredictable variables that are also measured in real-time and included in the calculations, such as friction forces, wind forces, wave and current forces, and load forces, among other factors or considerations. The calculations include such factors or considerations in a least squares calculation that produces a graph illustrated by the exemplary graph in FIG. 4. In the graph, the x-axis represents burn rate and the y-axis represents velocity. The maximum slope of the curve in the graph represents the "best fuel economy," and the point in the graph where the slope becomes zero represents the "best velocity." The values of burn rate and velocity corresponding to "best fuel economy" and "best velocity" are relayed to the captain in the wheelhouse to assist the captain in guiding the boat (or other vehicle).

Additionally, the computer programs in the computer 15 can include other calculations for the purpose of assisting the captain of the boat (or other vehicle), including conditions such as distance until the fuel tank 24 is empty, time until the fuel tank 24 is empty, and other alternative determinations of vehicle conditions.

The invention provides important advantages. The accountability system minimizes the likelihood that fuel will be accidentally wasted or intentionally siphoned off the boat or other vehicle. Additionally, the fuel economy and fuel optimization determinations provide conditions of feedback from which the captain can best conserve fuel while operating the vehicle.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to the illustrated embodiments. It will be apparent, however, that various modifications and changes can be made within the spirit and scope of the invention as described in the foregoing specification.

What is claimed is:

1. A system for establishing fuel accountability and optimization for a vehicle, the system comprising:
    a first fuel tank to contain hydrocarbon fuels, the first fuel tank being operably engaged to a first fuel sensor;
    an engine positioned inside the vehicle and being adapted to power the vehicle, the engine being operable with the hydrocarbon fuels supplied from the first fuel tank into the engine through a first fuel supply line directed from the first fuel tank to the engine;
    a first flow meter operably engaged to the first fuel supply line, the first flow meter to measure the flow rate of the hydrocarbon fuels moving through the fuel supply line from the first fuel tank into the engine;
    a communication network for transmitting data, the communication network interfacing with the first flow meter;
    a computer defining a server having a memory associated therewith, the computer interfacing with the communication network to communicate with the first flow meter, and the computer adapted to interface with a user;
    a computer program stored in the memory of the computer, the program comprising:
    (a) instructions to measure with the first fuel sensor an amount of fuel in the first fuel tank at a first point in time, the amount of fuel being determined through communication with the first fuel sensor,
    (b) instructions to measure with the first fuel sensor the amount of fuel in the first fuel tank at a second point in time, the amount of fuel being determined through communication with the first fuel sensor, and
    (c) instructions to determine the amount of fuel burned by the engine between the first point in time and the second point in time, the amount of fuel burned by the engine being determined by utilizing information obtained from communication with the first flow meter.

2. The system of claim 1, wherein the computer program further comprises instructions to determine an accounting whether the value resulting from instruction (a) is approximately equal to the sum of the values resulting from instruction (b) and instruction (c).

3. The system of claim 2, wherein the computer program further comprises instructions to alert the user of the results of the fuel accounting through a graphical user interface of the computer.

4. The system of claim 1, further comprising a transfer flow meter operably engaged to a transfer supply line, the transfer flow meter operable to measure the flow rate of the hydrocarbon fuels moving through the transfer supply line from the first fuel tank into the engine, wherein the computer program further comprises instructions to measure with a transfer flow meter the amount of fuel being transferred from the first fuel tank to a remote location from the vehicle between the first point in time and the second point in time, the amount of fuel being transferred from the first fuel tank to the remote location being determined by utilizing information obtained from communication with the transfer flow meter.

5. The system of claim 4, wherein the computer program further comprises instructions to determine an accounting for fuel amount whether a value resulting from instruction (a) is approximately equal to the sum of values resulting from instruction (b) and instruction (c) and the amount of fuel being transferred to the remote location.

6. The system of claim 1, wherein the computer program further comprises instructions to calculate a value for fuel economy, the instructions being responsive to the values determined for fuel amount.

7. The system of claim 1, wherein the computer program further comprises instructions to calculate a speed to maximize fuel efficiency, the instructions being responsive to the values determined for fuel amount.

8. The system of claim 1, wherein the computer program further comprises instructions to calculate a value for distance the vehicle can travel until the first fuel tank becomes empty, the instructions being responsive to the values determined for fuel amount.

9. The system of claim 1, wherein the computer program further comprises instructions to calculate a value for the time until the first fuel tank becomes empty, the instructions being responsive to the values determined for fuel amount.

10. The system of claim 1, further comprising a GPS component whereby a condition of the vehicle is determined from GPS coordinates.

11. The system of claim 1, wherein the first fuel tank is operably engaged to a second fuel sensor, and wherein the computer program comprises:
    (a) instructions to measure with the first fuel sensor an amount of fuel in the first fuel tank at a first point in time, the amount of fuel being determined through communication with the first fuel sensor,
    (b) instructions to measure with the second fuel sensor the amount of fuel in the first fuel tank at a second point in time, the amount of fuel being determined through communication with the second fuel sensor.

12. The system of claim 1, wherein the system further comprises a second fuel tank and a second flow meter and a second fuel sensor, and wherein the computer program further comprises:
    (a) instructions to measure with the first fuel sensor an amount of fuel in the first fuel tank at a first point in time, the amount of fuel being determined through communication with the first fuel sensor, (b) instructions to measure with the second fuel sensor an amount of fuel in the second fuel tank at a second point in time, the amount of fuel being determined through communication with the second fuel sensor, and (c) instructions to determine the amount of fuel burned by the engine between the first point in time and the second point in time, the amount of fuel burned by the engine being determined by utilizing information obtained from communication with the first flow meter and the second flow meter.

13. The system of claim 12, wherein the computer program further comprises instructions to determine an accounting whether the value resulting from instruction (a) is approximately equal to the sum of the values resulting from instruction (b) and instruction (c).

14. The system of claim 12, further comprising a transfer flow meter operably engaged to a transfer supply line, the transfer flow meter operable to measure the flow rate of the hydrocarbon fuels moving through the transfer supply line from either of the fuel tanks into the engine, wherein the computer program further comprises instructions to measure with the transfer flow meter the amount of fuel being transferred from the fuel tank to a remote location from the vehicle between the first point in time and the second point in time, the amount of fuel being transferred from the fuel tank to the remote location being determined by utilizing information obtained from communication with the transfer flow meter.

15. The system of claim 14, wherein the computer program further comprises instructions to determine an accounting whether the value resulting from instruction (a) is approximately equal to the sum of the values resulting from instruction (b) and instruction (c) and the amount of fuel being transferred to the remote location.

16. A computer program product embodied in a computer-readable medium, the program product comprising:

(a) instructions to measure with a first fuel sensor an amount of fuel in a first fuel tank at a first point in time, the amount of fuel being determined through communication with the first fuel sensor;

(b) instructions to measure with the first fuel sensor the amount of fuel in the first fuel tank at a second point in time, the amount of fuel being determined through communication with the first fuel sensor;

(c) instructions to determine the amount of fuel burned by an engine between the first point in time and the second point in time, the amount of fuel burned by the engine being determined by utilizing information obtained from communication with a first flow meter;

(d) instructions to determine an accounting whether the value resulting from instruction (a) is approximately equal to the sum of the values resulting from instruction (b) and instruction (c); and (e) instructions to alert a user of the results of the fuel accounting.

17. The computer program product of claim 16, further comprising a transfer flow meter operably engaged to a transfer supply line, the transfer flow meter operable to measure the flow rate of the hydrocarbon fuels moving through the transfer supply line from the first fuel tank into the engine, wherein the computer program further comprises instructions to measure with a transfer flow meter the amount of fuel being transferred from the first fuel tank to a remote location from the vehicle between the first point in time and the second point in time, the amount of fuel being transferred from the first fuel tank to the remote location being determined by utilizing information obtained from communication with the transfer flow meter.

18. The computer program product of claim 17, wherein the computer program further comprises instructions to determine an accounting for fuel amount whether a value resulting from instruction (a) is approximately equal to the sum of values resulting from instruction (b) and instruction (c) and the amount of fuel being transferred to the remote location.

19. The computer program product of claim 16, wherein the computer program further comprises instructions to calculate a value for fuel economy, the instructions being responsive to the values determined for fuel amount.

20. The computer program project of claim 16, wherein the computer program further comprises instructions to calculate a speed to maximize fuel efficiency, the instructions being responsive to the values determined for fuel amount.

21. The computer program product of claim 16, wherein the computer program further comprises instructions to calculate a value for distance the vehicle can travel until the first fuel tank becomes empty, the instructions being responsive to the values determined for fuel amount.

22. The computer program product of claim 16, wherein the computer program further comprises instructions to calculate a value for the time until the first fuel tank becomes empty, the instructions being responsive to the values determined for fuel amount.

23. The computer program product of claim 16, further comprising a GPS component whereby a condition of the vehicle is determined from GPS coordinates.

24. The computer program product of claim 16, wherein the first fuel tank is operably engaged to a second fuel sensor, and wherein the computer program comprises:

(a) instructions to measure with the first fuel sensor an amount of fuel in the first fuel tank at a first point in time, the amount of fuel being determined through communication with the first fuel sensor, (b) instructions to measure with the second fuel sensor the amount of fuel in the first fuel tank at a second point in time, the amount of fuel being determined through communication with the second fuel sensor.

25. The computer program product of claim 16, wherein the system further comprises a second fuel tank and a second flow meter and a second fuel sensor, and wherein the computer program further comprises:

(a) instructions to measure with the first fuel sensor an amount of fuel in the first fuel tank at a first point in time, the amount of fuel being determined through communication with the first fuel sensor, (b) instructions to measure with the second fuel sensor an amount of fuel in the second fuel tank at a second point in time, the amount of fuel being determined through communication with the second fuel sensor, and (c) instructions to determine the amount of fuel burned by the engine between the first point in time and the second point in time, the amount of fuel burned by the engine being determined by utilizing information obtained from communication with the first flow meter and the second flow meter.

26. The computer program product of claim 25, wherein the computer program further comprises instructions to determine an accounting whether the value resulting from instruction (a) is approximately equal to the sum of the values resulting from instruction (b) and instruction (c).

27. The computer program product of claim 25, further comprising a transfer flow meter operably engaged to a transfer supply line, the transfer flow meter operable to measure the flow rate of the hydrocarbon fuels moving through the transfer supply line from either of the fuel tanks into the engine, wherein the computer program further comprises instructions to measure with the transfer flow meter the amount of fuel being transferred from the fuel tank to a remote location from the vehicle between the first point in time and the second point in time, the amount of fuel being transferred from the fuel tank to the remote location being determined by utilizing information obtained from communication with the transfer flow meter.

28. The computer program product of claim 27, wherein the computer program further comprises instructions to determine an accounting whether the value resulting from instruction (a) is approximately equal to the sum of the values resulting from instruction (b) and instruction (c) and the amount of fuel being transferred to the remote location.

29. A method for establishing fuel accountability and optimization for a vehicle based upon a plurality of fuel amount values, the computer program product comprising:
measuring a first amount of fuel in a fuel tank at a first point in time, and measuring an second amount of fuel in the fuel tank at a second point in time;
determining an amount of fuel burned by an engine between the first point in time and the second point in time;
accounting whether the value for the first amount is approximately equal to the sum of the values for the second amount and the amount of fuel burned by the engine; and
alerting a user of the results of the accounting through a graphical user interface of a computer.

30. The method of claim 29, further comprising measuring a transfer amount of fuel that is transferred from the fuel tank to a remote location between the first point in time and the second point in time.

31. The method of claim 30, further comprising accounting whether the value for the first amount is approximately equal to the sum of the values for the second amount and the amount of fuel burned by the engine and the transfer amount.

32. The method of claim 29, further comprising calculating a value for fuel economy, the calculating being responsive to the fuel amount values.

33. The method of claim 29, further comprising calculating a speed to maximize fuel efficiency, the calculating being responsive to the fuel amount values.

34. The method of claim 29, further comprising calculating a value for distance the vehicle can travel until the fuel tank becomes empty, the calculating being responsive to the fuel amount values.

35. The method of claim 29, further comprising calculating a value for time until the fuel tank becomes empty, the calculating being responsive to the fuel amount values.

36. The method of claim 29, further comprising determining a condition of the vehicle, the determining being responsive to GPS coordinates of the vehicle.

\* \* \* \* \*

UNITED STATES PATENT AND TRADEMARK OFFICE
CERTIFICATE OF CORRECTION

PATENT NO. : 7,024,317 B1
APPLICATION NO. : 10/994449
DATED : April 4, 2006
INVENTOR(S) : Anthony George It is certified that error appears in the above-identified patent and that said Letters Patent is hereby corrected as shown below:

Page 25, line 6,)
Col. 11, line 22

After "amount values, the"

delete "computer program product"

and insert:

- -method- -

Signed and Sealed this

Twenty-second Day of August, 2006

JON W. DUDAS
*Director of the United States Patent and Trademark Office*